US012590795B2

(12) United States Patent
Otterbach et al.

(10) Patent No.: US 12,590,795 B2
(45) Date of Patent: Mar. 31, 2026

(54) FAIL OPERATIONAL STEERING ANGLE SENSOR

(71) Applicants: BOSCH CAR MULTIMEDIA PORTUGAL, S.A., Braga (PT); UNIVERSIDADE DO MINHO, Braga (PT)

(72) Inventors: Jens Otterbach, Ludwigsburg (DE); Jorge Miguel Nunes Dos Santos Cabral, São Torcato (PT); José António Azevedo Gonçalves, Arcozelo Bcl (PT); João António Gonçalves De Sousa Marques De Carvalho, São Tomé Abação (PT); Marco António Da Silva Esteves, Braga (PT); Rui Manuel Peixoto Faria, Braga (PT); Fábio André Da Costa Leitão, Gondifelos (PT); Álvaro Miguel Santos Magalhães, Oporto (PT); Luís Miguel Marinho Novais, Ponte Gmr (PT)

(73) Assignees: BOSCH CAR MULTIMEDIA PORTUGAL, S.A., Braga (PT); UNIVERSIDADE DO MINHO, Braga (PT)

( * ) Notice: Subject to any disclaimer, the term of this patent is extended or adjusted under 35 U.S.C. 154(b) by 266 days.

(21) Appl. No.: 18/693,728

(22) PCT Filed: Dec. 21, 2021

(86) PCT No.: PCT/IB2021/062124
§ 371 (c)(1),
(2) Date: Mar. 20, 2024

(87) PCT Pub. No.: WO2023/118932
PCT Pub. Date: Jun. 29, 2023

(65) Prior Publication Data
US 2024/0401926 A1 Dec. 5, 2024

(30) Foreign Application Priority Data

Dec. 21, 2021 (PT) ......................................... 117653

(51) Int. Cl.
| | |
|---|---|
| *G01D 5/16* | (2006.01) |
| *G01B 7/30* | (2006.01) |
| *G01D 5/20* | (2006.01) |

(52) U.S. Cl.
CPC ................. *G01B 7/30* (2013.01); *G01D 5/16* (2013.01); *G01D 5/20* (2013.01)

(58) Field of Classification Search
CPC ... G01B 7/30; G01D 5/16; G01D 5/20; B62D 5/04; B62D 5/0484; B62D 5/049; B62D 15/02; B62D 15/0245; B62D 15/0215
See application file for complete search history.

(56) References Cited

FOREIGN PATENT DOCUMENTS

| | | |
|---|---|---|
| DE | 102011002563 A1 | 6/2012 |
| DE | 102019133582 A1 | 6/2021 |

(Continued)

OTHER PUBLICATIONS

International Search Report and Written Opinion for Corresponding International Application No. PCT/IB2021/062124, Sep. 19, 2022, 11 pages.

(Continued)

*Primary Examiner* — Son T Le
(74) *Attorney, Agent, or Firm* — LUCAS & MERCANTI, LLP

(57) ABSTRACT

A Steering Angle Sensor (SAS), equipped with a redundancy system to allow the bypass of any failing part, keeping all functionalities intact, while ensuring all the required safety integrity levels is provided. The proposed fail operational redundant steering angle sensor (100) has two functional blocks (70) responsible to determine the absolute (Continued)

angle between at least two angling sensing devices, detecting systematic failures of the devices.

9 Claims, 1 Drawing Sheet

(56)                    References Cited

FOREIGN PATENT DOCUMENTS

| DE | 102020214518 A1 | 3/2022 |
| JP | 2009236515 A | 10/2009 |

OTHER PUBLICATIONS

International Search Report and Written Opinion for Corresponding International Application No. PCT/IB2021/062112, Oct. 11, 2022, 9 pages.

FAIL OPERATIONAL STEERING ANGLE SENSOR

CROSS-REFERENCE TO RELATED APPLICATION

This application is a 371 of PCT/IB2021/062124, filed Dec. 21, 2021, which claimed the priority of Portuguese Application No. 117653, filed Dec. 21, 2021, the contents of each of which are incorporated herein by reference.

TECHNICAL FIELD

The present invention describes a Steering Angle Sensor equipped with a redundancy system.

BACKGROUND ART

A Steering Angle Sensor (SAS) is a device that measures the angle and speed of rotation of a steering wheel. The information measured by the SAS is sent for analysis to the car control system, where together with information provided by other sensors, is used to control various driving assistance systems, such as electronic stability control, power steering and active steering control.

The majority of the known steering wheel angle sensors resorts to the use of magnetic sensitive devices to measure the wheel position. With the application of the nonius principle, the absolute steering can be calculated, once the steering can be turned more than 360° in each direction.

According to safety and system requirements, these sensors can vary from standard quality (QM) to ASIL A to D, as specified in ISO26262. In terms of signal availability, they are "Fail Safe", meaning that if an error is detected, the system is shut down.

Known present state of the art does not disclose the existence of a "Fail Operational" sensor solution.

SUMMARY

The present invention describes a fail operational redundant steering angle sensor comprising two functional blocks, functional block A and functional block B; a galvanic insulation connection bridge adapted to connect the two functional blocks; and at least two independent angling sensing devices, connected to both of the two functional blocks providing independent rotation angles; wherein the two functional blocks are adapted to determine the absolute angle of the at least two angling sensing devices and detect systematic and/or random failures of the at least two angling sensing devices.

In a proposed embodiment of present invention, the at least two angling sensing devices comprise a magnetic gear A and a magnetic gear B.

Yet in another proposed embodiment of present invention, the magnetic gear B comprises a dual die sensing element, sensing element C and sensing element D, wherein sensing element C is configured to provide a rotation angle C, and sensing element D is configured to provide a rotation angle D.

Yet in another proposed embodiment of present invention, the magnetic gear B comprises a single die sensing element, sensing element E configured to provide a rotation angle E.

Yet in another proposed embodiment of present invention, the magnetic gear A comprises a dual die sensing element, sensing element A and sensing element B, wherein sensing element A is configured to provide a rotation angle A, and sensing element B is configured to provide a rotation angle B.

Yet in another proposed embodiment of present invention, the at least two angling sensing devices further comprise an inductive target composed of a printed circuit board with adapted coils, connected to functional block A, configured to provide a rotation angle F.

Yet in another proposed embodiment of present invention, each of the two functional blocks, functional block A and functional block B, comprise a processing unit, processing unit A and processing unit B respectively, which are connected together through the galvanic insulation connection bridge to determine the rotation angle of the at least two angling sensing devices, identifying the existence of a faulty angling sensing device.

Yet in another proposed embodiment of present invention, the processing unit A of the functional block A is adapted to acquire a rotation angle A provided by the sensing element A of magnetic gear A and an rotation angle C provided by sensing element C of magnetic gear B; and the processing unit B of the functional block B is adapted to acquire a rotation angle B provided by sensing element B of magnetic gear A and an rotation angle D provided by sensing element D of magnetic gear B.

Yet in another proposed embodiment of present invention, the processing unit A of the functional block A is adapted to acquire a rotation angle A provided by sensing element A of magnetic gear A and an rotation angle provided F by the adapted coils of the inductive target; and the processing unit B of the functional block B is adapted to acquire a rotation angle B provided by sensing element B of magnetic gear A an rotation angle E provided by sensing element E of magnetic gear B.

GENERAL DESCRIPTION

The current invention describes a Steering Angle Sensor (SAS), equipped with a redundancy system that allows to bypass of any failing part, keeping all functionalities intact, while ensuring all the required safety integrity levels. The proposed sensor discloses a new architecture approach designed to ensure the sensor survival to a failure that accidently might occur.

This development stems from the introduction and evolution of the autonomous driving systems, where the traditional steering systems become obsolete and require updates to fulfil new requirements. To cope with the new and future requirements, specially from the steer by wire systems, a system upgrade is necessary to the steering angle sensor. Current existing Steering Angle Sensors are "fail safe" systems, meaning that it will enter into safe mode, not sending a valid angle, in case of any failure is detected.

Once this signal is extremely important to steer the wheels, particularly in the cases where there is no mechanical connection between the steering wheel and the wheels since this is being replaced by an electrical connection, the steering angle signal availability is vital to ensure the steering of the vehicle and has to progress to a "fail operational" system.

To increase the signal availability, while maintaining both the functionality intact and the highest quality standard ratings, the following solutions are proposed.

With this new solution, the total loss and failure of signal is overcome, allowing the driver to safely go to a garage to replace the possible defected part.

BRIEF DESCRIPTION OF THE DRAWINGS

For better understanding of the present application, figures representing preferred embodiments are herein attached which, however, are not intended to limit the technique disclosed herein.

FIG. 1—illustrates an embodiment for the proposed fail operational Steering Angle Sensor with redundancy system, wherein the numeric references relate to:

100—homogeneous fail operational redundant Steering Angle Sensor;

10—magnetic gear A comprising a dual die sensing element, sensing element A and sensing element B;

11—rotation angle A provided by sensing element A of magnetic gear A;

12—rotation angle B provided by sensing element B of magnetic gear A;

20—magnetic gear B comprising a dual die sensing element, sensing element C and sensing element D;

21—rotation angle C provided by sensing element C of magnetic gear B;

22—rotation angle D provided by sensing element D of magnetic gear B;

40—processing unit A;

50—processing unit B;

60—functional block A;

70—functional block B;

80—galvanic insulation connection bridge between both processing unit A and processing unit B, and processing unit A and processing unit B.

Figure 1:
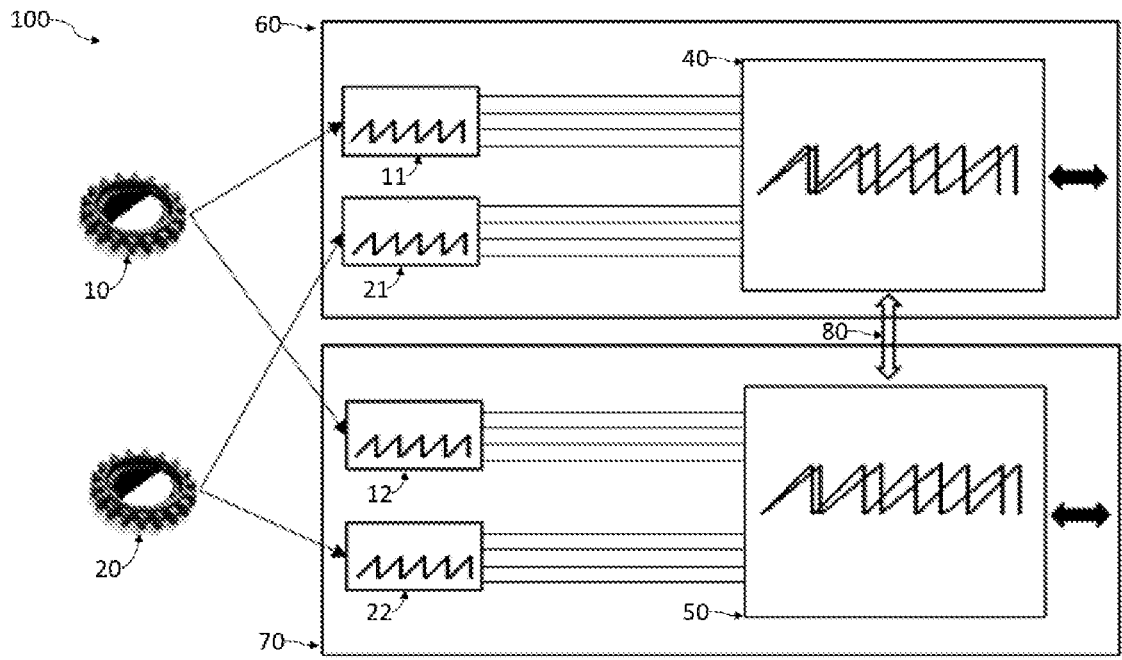
Figure 2:
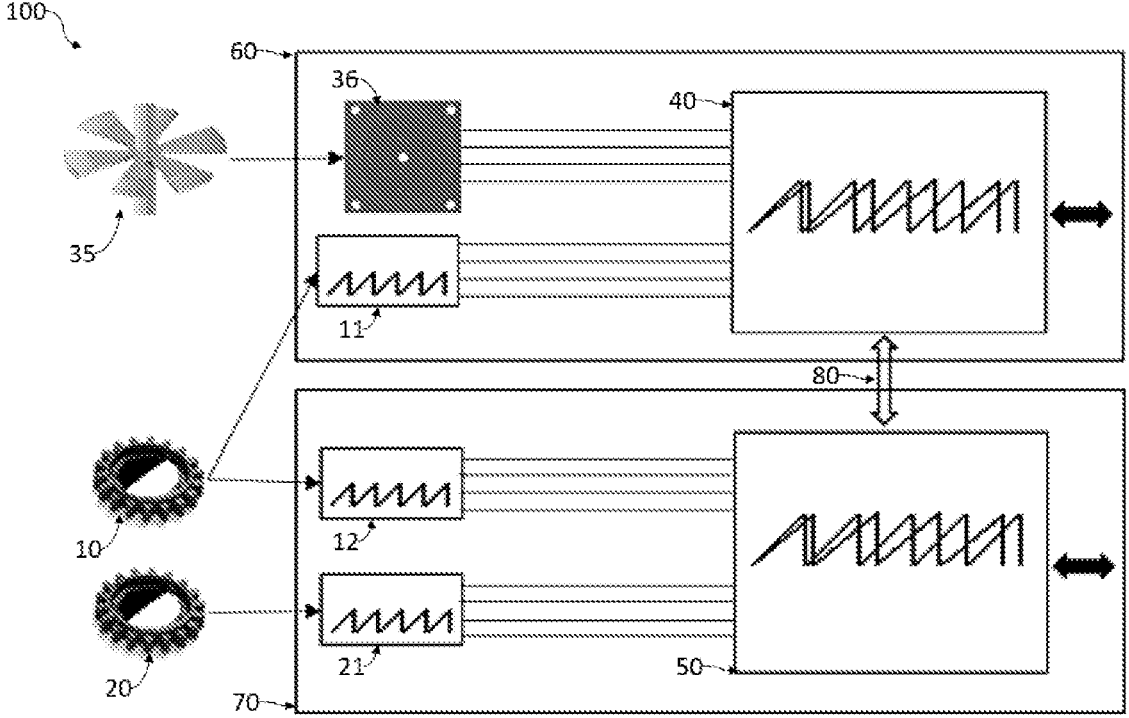

FIG. 2—illustrates an alternative embodiment for the proposed fail operational Steering Angle Sensor with redundancy system, wherein the numeric references relate to:

100—heterogeneous fail operational redundant Steering Angle Sensor;

10—magnetic gear A comprising a dual die sensing element, sensing element A and sensing element B;

11—rotation angle A provided by sensing element A of magnetic gear A;

12—rotation angle B provided by sensing element B of magnetic gear A;

20—magnetic gear B comprising a single die sensing element, sensing element E;

21—rotation angle E provided by sensing element E of magnetic gear B;

35—inductive target comprising a printed circuit board (PCB) with adapted coils to detect the target rotation;

36—printed circuit board with adapted coils to detect the target rotation angle F;

40—processing unit A;

50—processing unit B;

60—functional block A;

70—functional block B;

80—galvanic insulation connection bridge between both processing unit A and processing unit B, and processing unit A and processing unit B.

DESCRIPTION OF EMBODIMENTS

With reference to the figures, some embodiments are now described in more detail, which are however not intended to limit the scope of the present application.

The present invention describes a Steering Angle Sensor (SAS) comprising a redundancy system that allows to bypass of any failing part, keeping all functionalities intact, while ensuring all the required safety integrity levels.

In one of the proposed embodiments of presently disclosed invention, the redundant sensor (100) is comprised of a set of duplicated functional blocks, keeping the complete system active to detect and correct/bypass in case of any failure. This first approach, that can be designated as homogeneous, comprises two magnetic gears (10, 20) adapted to SAS, each one of said gears comprising a dual die sensing element that provide independent rotation angles of the SAS. More specifically, the magnetic gears (10, 20) are composed of magnetic gear A (10) and magnetic gear B (20). Magnetic gear A (10) comprises a sensing element A and a sensing element B. In a similar way, the Magnetic gear B (20) comprises a sensing element C and a sensing element D. The redundant sensor (100), in addition to the magnetic gears (10, 20), comprises two functional blocks, functional block A (60) and functional block B (70), galvanically separated. Each of said functional block (60, 70) comprises an independent processing unit, processing unit A (40) and processing unit B (50), wherein the functional blocks are connected through their independent processing units via a galvanic insulation connection bridge (80). Processing unit A (40), as well as processing unit B (50), is adapted to collect and analyze the rotation angle of the SAS in a unique and independent way based on the information of both magnetic gears (10, 20). Therefore, the processing unit A (40) of the functional block A (60) will be adapted to acquire the rotation angle from the SAS through the angle A (11) provided by sensing element A of magnetic gear A (10) and the angle C (21) provided by sensing element C of magnetic gear B (20). In a similar mirrored approach, the processing unit B (50) of the functional block B (70) will be adapted to acquire the rotation angle from the SAS through the angle B (12) provided by sensing element B of magnetic gear A (10) and the angle D (22) provided by sensing element D of magnetic gear B (20). With this approach, it is possible to keep the two magnetic gears (10, 20) concept with a dual die sensing element underneath each one, to provide an output voltage proportional to the magnetic field orientation of the SAS. With the dual die sensing elements, the information is separately sent to the different systems (60, 70), galvanically isolated (80) from each other.

In another proposed embodiment of presently disclosed invention, the redundant sensor (100) is still comprised of a set of duplicated functional blocks, keeping the complete system active to detect and correct/bypass in case of any failure. However, in this approach, which can be designated as heterogeneous, different methods of measuring the angle of the SAS are used, keeping the complete system active to detect and correct/bypass of any failure. This approach resorts to the use of two different yet redundant principles to measure the angle of rotation. In this particular case, there are used two magnetic gears (10, 20) and one inductive target (35). One of the magnetic gears, magnetic gear A (10) will still comprise a dual die sensing element, sensing element A and sensing element B. The second magnetic gear, magnetic gear C (20), comprises a single die sensing element E. The inductive target (35) is composed of a printed circuit board (36) comprising adapted coils to detect the target rotation. The redundant sensor (100), in addition to the magnetic gears (10, 20) and the inductive target (35), comprises the two functional blocks as the previous disclosed architecture, functional block A (60) and functional block B (70). Each of said functional block (60, 70) also comprises an independent processing unit, processing unit A (40) and processing unit B (50), wherein the functional blocks are connected through their independent processing units via a galvanic insulation connection bridge (80). Processing unit A (40), as well as processing unit B (50), is adapted to collect and analyze the rotation angle of the SAS in a unique and independent way based on the information provided by both magnetic gears (10, 20) and the inductive target (35). In the proposed embodiment, the processing unit A (40) of the functional block A (60) will be adapted to acquire the rotation angle from the SAS through the angle A (11) provided by sensing element A of magnetic gear A (10) and the angle provided by the printed circuit board with adapted coils of the inductive target (35). The processing unit B (50) of the functional block B (70) will be adapted to acquire the rotation angle from the SAS through the angle B (12) provided by sensing element B of magnetic gear A (10) and the angle E (21) provided by sensing element E of magnetic gear B (20).

To ensure the true power on, in combination with the inductive target (35), the second die of the magnetic sensor is used, allowing the application of the nonius principle. Both functional blocks (60, 70) are also galvanically separated through a galvanic insulation connection bridge (80). With this proposed layout approach, the Steering Angle Sensor is able to detect systematic failures of hardware and software with heterogeneous redundancy.

With this new solution, the total loss and failure of signal is overcome, allowing the driver of the vehicle to safely go to a garage to replace the possible defected part.

For the homogeneous approach, the magnetic gears (10, 20) comprise the use of dual die Tunneling MagnetoResistance sensors (TMR), allowing to keep the same magnetic gears, and at the same time, have two independent sources of angle signal, from the same gear, in one chip arrangement. The dual die magnetic gears (10, 20) provide twice the information with independent power supplies. The use of gears with different number of teeth's, allows to obtain different combinations of measurements, and thus determine the absolute angle.

For the heterogeneous approach, the magnetic gear A (10) comprises the use of a dual die TMR, the magnetic gear B (20) comprises the use of a single die TMR, and the inductive target (35) comprises a coil system printed on the PCB with a metallic rotor on top. With this approach it is possible to obtain different sources of the angle value and multiple possibilities for the absolute angle calculation. The functional block B (70) uses the angle from the magnetic sensors (10, 20) and the functional block A (60) resorts to the use of one magnetic sensor (10) and the information from the coils of the inductive target (35) to calculate the absolute angle.

The quality level of the redundant sensor (100) is ensured at the output interface, for example resorting to a Controller Area Network (CAN), and a failure situation is treated on a sensor level. This will allow the reduction of power consumption from the steering system Engine Control Unit (ECU) and a real true-power-on even in fail operation condition. When using a CAN protocol to send the calculated angle data, the sensor can make it available to the upper (sensor unit) and lower (actuator) system at the same time. If there is a failure in the upper system, the wheels can still be turned based only on the SAS information.

The proposed solution can be applied to existing steering systems where this type of sensors is used, namely in Electronic Stability Program (ESP®, Active steering, 4 wheel steering, Park assist/Automated Parking Aid, Adaptive headlights (AFS), Lane Departure Warning, Driver Drowsiness Detection Rear View Camera, etc.) and for the most recent technology of steer by wire systems and power steering.

The invention claimed is:

1. A fail operational redundant steering angle sensor (100) comprising two functional blocks, functional block A (60) and functional block B (70);

a galvanic insulation connection bridge (80) adapted to connect the two functional blocks; and at least two independent angling sensing devices, connected to both of the two functional blocks providing independent rotation angles;

wherein the two functional blocks are adapted to determine the absolute angle of the at least two angling sensing devices and detect systematic and/or random failures of the at least two angling sensing devices.

2. The fail operational redundant steering angle sensor (100) according to claim 1, wherein the at least two angling sensing devices comprise a magnetic gear A (10) and a magnetic gear B (20).

3. The fail operational redundant steering angle sensor (100) according to claim 1, wherein the magnetic gear B (20) comprises a dual die sensing element, sensing element C and sensing element D, wherein sensing element C is configured to provide a rotation angle C (21), and sensing element D is configured to provide a rotation angle D (22).

4. The fail operational redundant steering angle sensor (100) according to claim 1, wherein the magnetic gear B (20) comprises a single die sensing element, sensing element E configured to provide a rotation angle E (21).

5. The fail operational redundant steering angle sensor (100) according to claim 1, wherein the magnetic gear A (10) comprises a dual die sensing element, sensing element A and sensing element B, wherein sensing element A is configured to provide a rotation angle A (11), and sensing element B is configured to provide a rotation angle B (12).

6. The fail operational redundant steering angle sensor (100) according to claim 1, wherein the at least two angling sensing devices further comprise an inductive target (35) composed of a printed circuit board with adapted coils, connected to functional block A (60), configured to provide a rotation angle F.

7. The fail operational redundant steering angle sensor (100) according to claim 1, wherein each of the two functional blocks, functional block A (60) and functional block B (70), comprise a processing unit, processing unit A (40) and processing unit B (50) respectively, which are connected together through the galvanic insulation connection bridge (80) to determine the rotation angle of the at least two angling sensing devices, identifying the existence of a faulty angling sensing device.

8. The fail operational redundant steering angle sensor (100) according to claim 1, wherein the processing unit A (40) of the functional block A (60) is adapted to acquire a rotation angle A (11) provided by the sensing element A of magnetic gear A (10) and an rotation angle C (21) provided by sensing element C of magnetic gear B (20); and the processing unit B (50) of the functional block B (70) is adapted to acquire a rotation angle B (12) provided by sensing element B of magnetic gear A (10) and an rotation angle D (22) provided by sensing element D of magnetic gear B (20).

9. The fail operational redundant steering angle sensor (100) according to claim 1, wherein the processing unit A (40) of the functional block A (60) is adapted to acquire a rotation angle A (11) provided by sensing element A of magnetic gear A (10) and an rotation angle F provided by the adapted coils of the inductive target (35); and the processing unit B (50) of the functional block B (70) is adapted to acquire a rotation angle B (12) provided by sensing element B of magnetic gear A (10) an rotation angle E (21) provided by sensing element E of magnetic gear B (20).

\* \* \* \* \*